March 1, 1938.                H. CHIREIX                2,109,835
ANTENNA WITH REDUCED ZENITH RADIATION
Filed Oct. 30, 1935
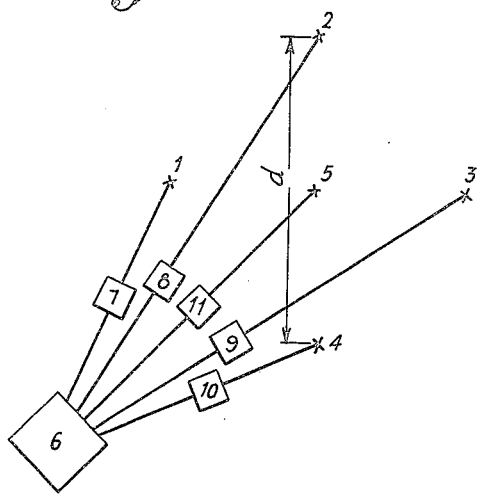
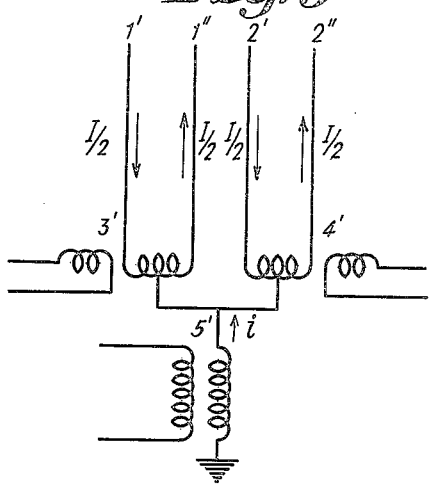
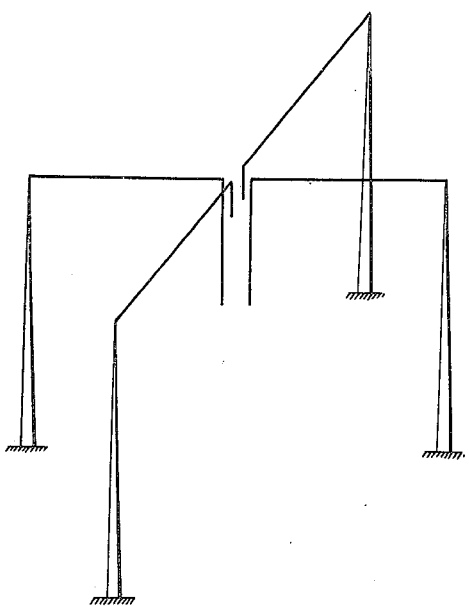
INVENTOR.
HENRI CHIREIX
BY
ATTORNEY.

UNITED STATES PATENT OFFICE 2,109,835

ANTENNA WITH REDUCED ZENITH RADIATION

Henri Chireix, Paris, France, assignor to Compagnie Generale de Telegraphie Sans Fil, a corporation of France Application October 30, 1935, Serial No. 47,402
In France January 7, 1935

7 Claims. (Cl. 250—33)

It is known, in order to increase the zone of reception suitable for radio broadcasting stations and at the same time increasing their day propagation distance, to employ antennae, or antenna systems which tend to reduce the zenith radiation, while at the same time conserving a uniform radiation in the horizontal plane. Various combinations are of practical use as long as the wave length is small, but difficulties are encountered in solving the problem in the case of larger wave lengths (1000 to 2000 meters for instance).

The present invention, provides, among other things, an economic solution, and, although this solution is recommended for stations of relatively long waves, it is just as well applicable to shorter waves.

It is possible to decrease the energy radiated under a larger angle of inclination, and consequently, to increase for a given power, the energy of horizontal radiation (ground level radiation) by providing, at the transmitter station, a system having a rotating field, and which can be accomplished by means of a certain number of elementary antennae disposed in a circle and in phase displacement relative to each other in such manner that the total phase displacement is $2\pi$ for the completed circle. The diameter of the circle is advantageously between one-quarter and one-half wave (for instance one-third wave), and the height of the individual antennae may be maintained below one-quarter wave, although it would be of advantage to make it higher.

It will be found that by reducing the number of antennae to six, or even to four, the field will still be sufficiently "rotating" to obtain substantial uniformity of the field in the horizontal plane for the entire horizon.

In reducing the assembly to four antennae, arranged in a square and consequently with a phase displacement of $\pi/2$ relative to each other, and fed by equal currents, it will be found from a simple calculation, by designating by $\varphi$ the horizontal angle with respect to one of the diagonals, $\tau$ the angle in the vertical direction relative to the horizon, $d$ the diameter of the circumscribed circle, and $\lambda$ the wave length of the frequency pulsation $\omega$, that the field is proportional to the expression:

$$2I_1(z) \cos (\omega t - \varphi) - 2I_3(z) \cos (\omega t + 3\varphi) + \ldots$$

wherein $$z = \frac{\pi d}{\lambda} \cos \tau$$

$I_1(z)$, $I_3(z)\ldots$ designate the values of the Bessel functions of the argument $(z)$ and of the order 1, 3 ... etc.

The relation shows that a rotating field having the relative amplitude $2I_1(z)$ will be superposed on a rotating field of the same velocity but at phase displacement of $4\varphi$; this second rotating field producing the fluctuations of the principal field due to the reduced number of antennae and due to the relatively wide spacing thereof.

The total field has a fluctuation in space of the cycle $4\varphi = 2\pi$ or $\varphi = \pi/2$ as is obvious; the curve of the field presents four minima in the alignments corresponding with the diagonals.

The ratio $$\frac{I_3(z)}{I_1(z)}$$

hence determines the fluctuation per cent.

It evidently decreases when $z$ decreases, i. e., when $d$ or $\cos \tau$ decrease, thus being maximum at ground.

From the tabulation, it can be easily calculated that for $z=1$ there is at ground for $d=\lambda/\pi$.

$$\frac{I_3(1)}{I_1(1)} = 0.045$$

and that for $z=1, 2$, there is at ground for $d=1, 2\lambda/\pi$.

$$\frac{I_3(1,2)}{I_1(1,2)} \cong 0.066$$

The fluctuation of the principal field, therefore, will be only in these limits of about 0.06 at ground and will decrease more and more when the angle increases towards the zenith.

On the other hand, the calculation shows that for $$z=1, 2, \text{ or } \frac{d}{\lambda} \cong 0.385, 2I_1 = 1$$

The average rotating field therefore has the value resulting from the arithmetical combination of the currents of two of the antennae.

Drawing for these conditions the diagram of the field in the vertical plane, it will be found that the field as a function of the height (for an antenna of small height at $\lambda/4$) is proportional to $2I_1(z) \cos \tau$, and follows for these values approximately the law $\cos^2 \tau$.

Hence, with the combination described, there will be obtained very substantially, the same field law, as with a half wave antenna, with a gain of about 20% in the field observed at the ground at large distance and this with equal radiated power.

For an antenna with a greater height, the gain is somewhat greater. There remains no interest in increasing $d$, since this involves at the same time an increase of $$\frac{I_3}{I_1}$$

i. e., an increase of the fluctuation of the field.

It will be readily found that even with six antennae in place of four, the fluctuation is given by the relation $$\frac{I_5(z)}{I_1(z)}$$

$I_5(z)$ being the function of the order 5 (a function entirely negligible in the case of the envisaged antennae spacing). Here resides the interest in the described disposition since there is but little gained as regards the regularity of the field, while on the other hand, the cost of the arrangement will be very much higher.

An increase of the individual heights of the antennae results in narrowing the diagram in the vertical plane and consequently produces, at equal radiated energy, a notable increase of the field in the horizontal plane.

It is sometimes desirable with respect to the physical configuration of certain countries, to provide a preferred radiation in a certain axis or in a certain direction. The present arrangement in its modified or extended form, is particularly well suited for obtaining such diagrams of directions and this is a novel characteristic feature of the invention.

It is, for instance, possible to feed the elementary antennae with unequal intensities. In particular, the case of four antennae, one pair of antennae could be fed, corresponding with the extremities of one and the same diagonal, with a current different from that of the other pair thus creating thereby an elliptical diagram in the horizontal plane.

An effect of still greater interest could be obtained by providing a single vertical antenna in the center of the system. It can then be seen that to the studied radiation, another more or less important radiation will be added, depending upon the energy produced in this antenna. The preferred direction then turns with the phase of the feed of this supplementary antenna, the entire radiated field could in fact then be as follows:

$$A \cos (\omega t - \varphi) + B \cos (\omega t - \theta)$$

The first term represents the effect of the system previously studied and the second term the effect due to the single vertical antenna in the center.

It will be noted that by varying $\theta$ i. e., the phase of the feed current of this antenna, the directions of the maximum and minimum field (maximum field for $\varphi = \theta$ minimum field for $\varphi = \theta + \pi$) will be displaced.

Finally, in this last case, the preferred direction can be very rapidly changed by influencing the phase.

If, instead of restricting the total phase shift to $2\pi$ it is increased, according to the present invention, say to $4\pi$, $6\pi$ etc., there are obtained functions of a higher order in a similar way and for a sufficient number of antenna elements:

$$I_2(z), I_3(z)$$

the diagram as a matter of fact being given by:

$$\frac{I}{\pi} \int_0^\pi \cos(z \sin \varphi - n\varphi) d\varphi = I_n(z)$$

where $\varphi$ is the bearing of the ground in reference to an origin direction.

In this equation, $n=1$ corresponds to the case taken into consideration previously and $n=2$, $n=3$ ... etc., to the cases where the total phase shift would be two, three or more complete periods in lieu of one.

As a matter of fact, if instead of four antennae regularly spaced apart as to their phases by $\pi/2$ and mounted in a circle, there were used eight regularly shifted by $\pi/2$, or twelve similarly shifted by $\pi/2$ in reference to one another, there would result these functions:

$$I_2(z), I_3(z)$$

with sufficient approximation as long as $d/\lambda$ is not too great. As a matter of fact, as pointed out above, there is no particular reason or interest in making $d/\lambda$ too large; and if $d/\lambda < 1$, then the number of antennae will be large enough to avoid all chances of marked directional action in the horizontal plane.

Under these conditions, the ensuing diagram are extremely interesting in this sense that, for simple doublets, the intensity of the radiated field varies with the height as:

$\cos^2 \tau$ for $n=1$
$\cos^3 \tau$ for $n=2$
$\cos^4 \tau$ for $n=3$ ... etc.

while for elementary antennae of ½ wave height there is sensibly gained further one degree in the cos power.

As a matter of fact, the diagram becomes more and more flattened and without additional loops being incidentally formed, contradistinct from what is inevitably true of all of the known systems.

In fact, in analogy with machines it may be said that the antenna suggested at the beginning of this specification is equivalent to two-phase, two-pole motor winding, designed at the rate of one slot per pole and per phase. Now the antennae hereinbefore suggested correspond to two-phase four-pole, six-pole, etc., winding schemes at the rate of one slot per pole and per phase. Evidently it would be possible to provide rotary-field type systems that are more uniform, though it seems that this would be an unnecessary complication.

As to the rest, it may be noted that the feeding of such a system is rather simple, seeing that all of the aerials could be connected, in the proper and convenient senses, with two coupling coils traversed by two-phase currents.

There has also been disclosed an auxiliary antenna mounted in the middle so as to impart to the system a certain amount of directivity in the horizontal plane. This antenna, of course, could be retained, though instead of one preferential direction there may be two at 180 or three at 120 degrees, etc.

Figs. 1 to 3 represent schematically different circuit embodiment of the invention.

Referring to Fig. 1, the latter comprises four antennae 1, 2, 3, 4, disposed on top of a square whose diagonal is $d=\lambda/3$. The height of the individual antenna is $\lambda/8$. These antennae are fed from the radio frequency source 6 by way of feeders in which are included the phase-shifting means 7, 8, 9, 10. The supply phase of antenna 2 lags $\pi/2$ in respect to that of antenna 1; the supply phase of antenna 3 lags $\pi/2$ in reference to that of antenna 2. Finally, the supply phase of antenna 4 lags $\pi/2$ with respect to antenna 3 and leads by $\pi/2$ the supply of antenna 1.

In the center of the square is disposed an additional antenna 5, the feeder of which contains a regulator 11 adapted to vary or shift the supply phase so as to regulate or control the encouraged or preferred direction of the radiations.

With a view to insuring simplification of supply or feed, it is also possible to feed all of the antennae through their tops and the annexed Figs. 2 and 3 indicate such a mode of feeding in the case comprising four antennae peripherally mounted and one central antenna.

As shown in Fig. 2, the peripheral antennae consist of the towers or masts proper which are connected to the ground either directly or else by way of a suitable impedance, the object of the latter then being to alter the distribution of the current or else, in the more particular instance where these impedances consist of condensers, to raise the loop (anti-node) of the current above the ground.

The auxiliary antenna consists of wires to feed current to the masts.

Fig. 3 shows the coupling arrangement. The wires denoted by 1', 1'', on the one hand and 2', 2'', on the other, serve as leads and returns for the currents I/2 resulting in the rotating field. For this purpose they are fed by way of the transformers 3' and 4' from a two-phase generator. These same wires 1', 1'' and 2', 2'' associated in parallel constitute a central antenna traversed by the current $i$ fed by way of the transformer 5'. The latter is also supplied from the two-phase source, the current so supplied having a phase which will be governed by the diagram or field pattern to be insured. Current $i$ returns also by way of the masts and in phase in the various masts so that the auxiliary antenna consists of the central uplead and peripheral downleads, the whole behaving like a single central antenna.

Whereas the Fig. 1 is concerned particularly with long waves as used in radio broadcasting, the Figs. 2 and 3 are concerned with medium and short waves, and it is then possible to carry the assembly of the system into practice by supporting it, for instance, by means of a single mast serving in a way as an antenna of the so-called umbrella type, and the mast in this case could itself serve as the central antenna.

What is claimed is:

1. System of antenna comprising a certain number of antennae disposed equal distances apart along the periphery of circle, and means for feeding each antenna with a current presenting a phase displacement angle in reference to the current of the adjoining antenna, the phase angle between the currents in each pair of adjacent antennae in the system being constant and the sum total of the phase shifts along the periphery of the circle being equal to $2\pi K$, K being a whole number equal at least to 2.

2. System of antenna comprising a certain number of antennae disposed equal distances apart along the periphery of a circle, and means for feeding each antenna with a current presenting a phase displacement angle in reference to the current of the adjoining antenna, the phase angle between the currents in each pair of adjacent antennae in the system being constant and the sum total of the phase shifts along the periphery of the circle being equal to $2\pi$ multiplied by a whole number, and an additional antenna located in the center of the circle for imparting a desired directivity to said system.

3. System in accordance with claim 2, in combination with means for feeding said additional antenna with a current presenting a pre-arranged phase and with means adapted to vary this phase.

4. System of antennae comprising a number of antennae equal to four multiplied by a whole number, being equi-spaced apart along the periphery of a circle, a source of two-phase current, and means to feed the successive antennae by this source with a constant phase shift or angle, the sum total of the phase displacements along the periphery of the circle being equal to $2\pi K$, K being a whole number equal to at least 2.

5. System of antenna comprising a certain number of antennae disposed equal distances apart along the periphery of a circle whose diameter ranges between a fourth and a half of the wavelength and means to feed each antenna by a current phase displaced in reference to the current of the adjacent antenna, the phase displacement between the currents in each pair of adjacent antennae in the system being constant and the sum total of the phase shifts along the periphery of the circle being equal to $2\pi K$, K being a whole number at least equal to 2.

6. A transmitting antenna system comprising a certain number of antennae disposed equal distances apart along the periphery of a circle, a feed line or feeder for each one of these antennae comprising an uplead disposed in the center of the circle, and a connection between the uplead and the end of the respective antenna away from the ground, means to feed the upleads by currents being respectively phase displaced so that the phase angle between the currents in each pair of neighboring antennae is constant and that the sum total of phase shifts along the periphery of the circle is equal to $2\pi$ multiplied by an integer, and separate means to feed the upleads with equal currents being in phase, with a view to operating the assembly of feeder lines just like a single central antenna.

7. A transmitting antenna system comprising a number of antennae equal to four multiplied by an integer, disposed at equal distances apart along the periphery of a circle, a feeder lead for each one of these antennae comprising an uplead disposed in the center of the circle, and a connection between the uplead and the respective end of the antenna away from the ground, a source of two-phase current coupled with the inter-connected inleads in order that the feed currents of the successive antennae show a constant phase displacement angle equal to $2\pi$ multiplied by an integer divided by the number of the antennae, and a source of single-phase current coupled with the upleads in order to excite them in phase and cause operation as in a single antenna.

HENRI CHIREIX.